United States Patent Office 3,295,496
Patented Jan. 3, 1967

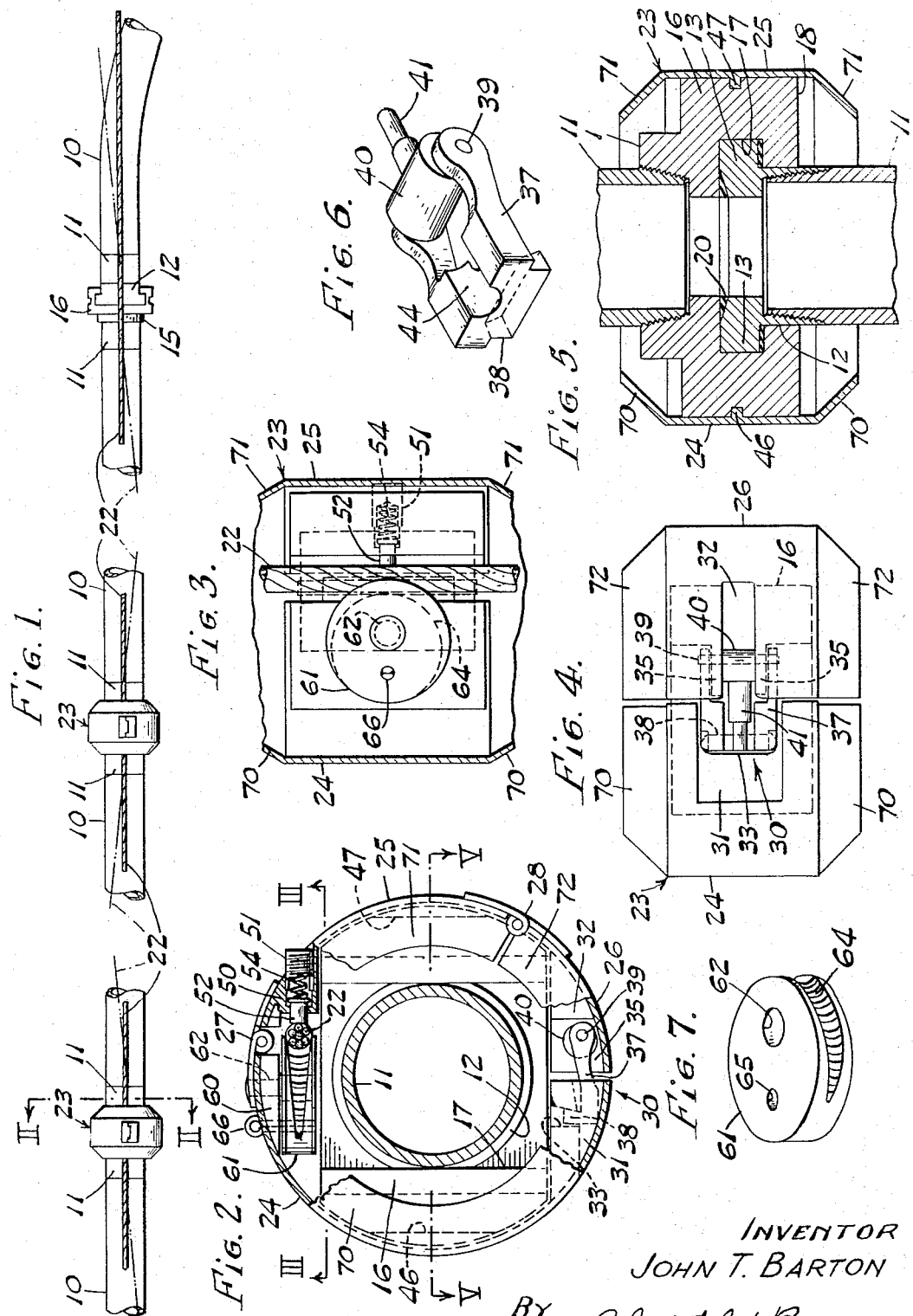

3,295,496
HOSE AND CABLE COUPLING
John T. Barton, Montour Falls, N.Y., assignor to Perkins Pipe Linings, Inc., Grand Island, N.Y.
Filed Nov. 6, 1963, Ser. No. 321,745
6 Claims. (Cl. 118—506)

This invention relates to a flexible conduit consisting of sections connected end-to-end by means of couplings and to attachments for attaching cables to such couplings so that the cables extend alongside the connected conduit sections.

A particular field of use of the improvements of the present invention is in connection with machines for applying plastic or semi-fluid lining material to the interiors of subterranean pipe. Perkins et al. Patent No. 2,988,042 dated June 13, 1961, shows a pipe lining machine which is drawn through an underground pipe by a cable and winch arrangement to apply a layer of cement mortar to the interior of the pipe. The mortar is continuously fed to the machine from above ground through a flexible conduit or hose as the machine is drawn through the pipe by the cable.

As discussed in Perkins Patent No. 2,786,486 dated March 26, 1957, it is desirable to shorten the mortar conduit as the distance from the lining machine to the mortar supply source is shortened since the pressure required to force the mortar through the conduit is directly proportioned to the length of the conduit. Conversely, it is generally the practice to begin a pipe lining operation by moving the lining machine through a conduit in the opposite direction to the direction of lining movement, the conduit being added section by section from the finishing end as the lining machine is moved to a relatively remote starting point. The patent just mentioned discloses quick-detachable coupling for readily lengthening and shortening the mortar conduit by adding removable hose sections. The present invention may include couplings of the general type contemplated in Perkins Patent No. 2,786,486.

In Patent No. 2,988,042, mentioned above, the cable which draws the pipe lining machine through the underground pipe as the lining operation progresses is connected to the lining machine at one end and to a power operated winch at the other end. Beginning at the machine-connected end of the cable, the cable is attached to the hose couplings along the mortar conducting hose so that the pulling action of the cable withdraws the underground portion of the hose as the lining machine progresses toward the winch and the mortar supply source which are both generally located above ground at one end of the section of pipe which is being lined.

In attaching the pulling cable to the hose couplings provision must be made for ready detachment so that, as connected portions of the mortar hose and winch cable approach the mortar supply source and the winch, the two may be quickly and conveniently separated.

Wire rope cable of the type employed in the foregoing machine pulling function does not naturally lie straight and considerable tension must be applied to straighten the same. Accordingly, if the cable is attached to a succession of hose couplings without special provision for this problem, the cable will be slightly bowed and kinked along its length from the first cable connected hose coupling to the last.

Accordingly, most of the pulling force of the cable will be applied to the hose coupling which is nearest to the winch and mortar supply and the hose pulling force between such coupling and the machine will be borne by the hose itself. In fact, in extreme cases the mortar hose may actually be serving as the machine pulling element throughout substantial portions of its length. In any event, undesirable stretching forces will be applied to the hose by the pull of the cable.

Perkins Patent No. 3,046,938 dated July 31, 1962, provides a cable and hose attachment arrangement which is directed to the elimination of slackness in the cable between points of attachment to the hose couplings so that the cable pulls more or less uniformly against the several hose couplings and so that the ultimate pulling force of the cable on the machine is applied directly to the lining machine by the cable, rather than in whole or in part through the mortar hose. However, in this patent the cable gripping arrangement is unidirectional and permits the conduit to be pulled along by the cable only in the direction of pipe lining movement.

In practice the initial set-up preparatory to a pipe lining operation is most conveniently practiced and accomplished by building up the mortar conduit section-by-section at the end of the pipe where the lining operation finishes, the conduit being drawn into the pipe at such finishing end and toward the starting end by means of cable and a winch located at the starting end. It is desired in this procedure that the cable which is successively attached to the couplings as the mortar conduit is being built up at the starting end be capable of pulling on the several couplings to draw the mortar conduit into the pipe to be lined. Accordingly, a unidirectional draft connection between the cable and the conduit coupling is unsatisfactory.

The present invention provides a conduit and cable coupling of this type wherein the connection is such as to be self-locking in either direction whereby a pull on the cable in either direction may exert substantially uniform pulling forces on the several hose or conduit couplings to which it is attached. The cable connection of the present invention is so arranged that slack in the cable may readily be eliminated by the workman during the hose-assembling operation which is accompanied by the step of pulling the mortar hose through the pipe to the position for beginning a lining operation. The connection of the present invention further provides means for selectively disabling the bidirectional self-locking means whereby the cable may be pulled relative to the connection to eliminate slack, as desired.

A single embodiment of the hose or conduit coupling and cable attaching apparatus of the present invention is illustrated in the accompanying drawing and described in detail in the following specification by way of example. However, it is to be understood that such embodiment is illustrative only and that various mechanical modifications may be introduced without departing from the principles of the invention and the scope thereof is not limited to the embodiment disclosed herein nor otherwise than as defined in the appended claims.

In the drawing:

FIG. 1 is a general fragmentary top plan view of a series of hose sections and an attached winch cable showing coupling and cable attaching means constructed in accordance with one form of the present invention;

FIG. 2 is a transverse cross sectional view on the line II—II of FIG. 1 on an enlarged scale;

FIG. 3 is a detailed cross sectional view on the line III—III of FIG. 2;

FIG. 4 is a bottom plan view of one of the hose couplings of FIG. 1 on an enlarged scale;

FIG. 5 is a cross sectional view on the line V—V of FIG. 2;

FIG. 6 is a detailed perspective view of a locking member of one of the coupling clamp members; and FIG. 7 is a perspective view of a cable cam lock of one of the coupling clamp members.

Like characters of reference denote like parts throughout the several figures of the drawing and, referring to FIG. 1, the numeral 10 designates a series of hose or flexible tubular members of the type employed to conduct cement mortar from a source of supply, usually above ground, to a pipe lining machine located within a subterranean pipe. Each hose member 10 has a permanently attached ferrule or nipple 11 at each end for connection with coupling members or other fittings.

In the present instance the nipple 11 at one end of each hose member 10 is threaded into a coupling collar 12 having two outwardly projecting flanges 13 along opposite sides thereof. The nipple 11 at the other end of each hose is threaded into a coupling collar 15 having an enlargement 16 which has a T-slot formation 17 in its outer end face 18 into which the flanges 13 of collar 12 may be slid by relative movement of the coupling collars 12 and 15 in a direction at right angles to the axis of the hose members.

The outer end of coupling collar 12 which bears the flanges 13 is recessed to receive a resilient sealing or packing member 20 of Neoprene or the like. This forms a very effective fluid-tight joint since radially outward pressure against the confined resilient member 20 tends to expand the same in an axial direction. Coupling members of the foregoing description may be employed in conjunction with the apparatus of the above-mentioned Perkins U.S. Patent No. 2,786,486 for removing individual hose or tubing sections from a line while the line is in operation and under internal fluid pressure.

Reference will now be had to clamp means attachable about the enlargement 16 of each coupling collar 15 to retain an associated coupling collar 12 assembled therewith and to provide means for associating cable means therewith in a novel manner whereby, after assembly, the cable may be moved relative to the coupling when desired but may be fixed for joint movement therewith in either direction, in a manner and for purposes which will presently appear.

Referring to the present apparatus as the same is used in conjunction with the pipe lining machine referred to above and disclosed in the aforesaid Perkins Patent No. 2,988,042, in FIG. 1, the left-hand end of the series of hose or tubing sections 10 is the end which is connected to the pipe lining machine and the right-hand end is the end which connects with the mortar supply source.

The cure of the hose member 10 at the right-hand end of FIG. 1 indicates the divergence of the hose and the cable at this end of the line, the cable being designated 22 in the drawing. From the right-hand end of FIG. 1 the hose extends to the mortar supply source while the cable 22 extends to the power winch which pulls the apparatus through a pipe being lined. Consequently, at approximately the portion of the hose and cable shown at the right-hand side of FIG. 1 the clamp means just referred to is released to permit such divergence of the hose and cable.

Referring particularly to FIG. 2, the clamp member which is generally designated by the numeral 23 in FIG. 1 comprises three generally arcuate members 24, 25 and 26 which are hinged as at 27 and 28 in FIG. 2 to form a generally circular frame adapted to be disposed about the enlargement 16 of coupling collar 15.

Referring particularly to FIGS. 2 and 4, the locking assembly 30 comprises generally a pair of blocks 31 and 32 which are welded to the interiors of the adjacent ends of the arcuate members 24 and 26, respectively. Block 31 is provided with an oblong latch receiving opening 33 and block 32 is provided with a pair of spaced ears 35 which comprise bearing formations for the latch operating member.

Referring now particularly to FIG. 6, a U-shaped latch member 37 has a medial latch projection 38 and is pivoted eccentrically at its opposite ends as at 39 to the outer ends of a shaft 40 which comprises the operating member of the latch mechanism. The cylindrical portion of shaft 40 is rotatably journaled in the bearing ears 35 of block 32. In FIG. 6 the numeral 41 designates an extension on shaft 40 which comprises a manual operating member.

In FIG. 6 the latch operating member 40, 41 is shown in the unlatched position. When the parts are in this relative position the latch projection 38 may be freely moved into latch opening 33 by pivotal movement of the latch member 37 on its pivotal connection with the ends of shaft 40.

Thereupon the shaft 40 is rotated by means of handle 41 through approximately 180° which, by reason of the eccentric connections 39 of the latch member with shaft 40, shortens the distance between the axis of shaft 40 and latch member 38 and causes the latter to engage securely against an undercut portion at the edge of the latch receiving opening 33 of block 31. It will further be noted that at this time the manual operating handle 41 will be nested within a groove formed in the medial portion of latch member 37, shown at 44 in FIG. 6, whereby there are no projecting portions.

FIG. 2 in particular shows the arcuate members 24, 25 and 26 securely locked about the enlargement 16 to prevent lateral displacement of the coupling collar 12 relative to the enlargement 16. In order to prevent axial displacement of the arcuate clamp members with respect to enlargement 16, the arcuate members 24 and 25 are provided with internal ribs 46 and 47 which fit within peripheral grooves in enlargement 16.

The means for associating the draw cable 22 with the clamp assembly in a novel manner will now be described. The arcuate member 25 is provided at its interior surface and adjacent to the pivot 27 with a fixed block 50. The block 50 is tapped to receive a headless set screw 51 and at its inner end is provided with a reduced bore. A headed pin 52 has its shank portion projecting through the reduced bore of block 50 and its head portion is disposed in the bottom end of the aforesaid tapped hole. Set screw 51 is bored to receive a spring 54 which bears against the head of pin member 52 to urge the same yieldably outwardly (to the left as viewed in FIG. 2).

The adjacent end of arcuate member 24 is provided with a block 60 and a sheave-like wheel 61 is eccentrically pivoted to the interior surface of block 60 as at 62, so that wheel 61 is freely rotatable.

The side of sheave 61 which is toward the adjacent wall of block 50, this being the small side of sheave 61 with respect to its eccentric mounting, is provided with a groove 64 which is deepest at its mid point and gradually recedes in opposite directions as shown in FIGS. 3 and 7.

Under certain conditions of operation it is desired that the sheave 61 be held in a central inoperative position and to this end a hole 65 is formed in sheave 61 and a registering opening is formed in block 60 whereby a cotter pin 66 may be passed through both the openings to lock the sheave 61 in mid position as shown in FIG. 2.

The operation of this portion of the cable clamp connection is as follows. An operator stationed at the finishing end of a pipe to be lined connects mortar conduit or hose sections 10 one by one and the same are pulled successively through the conduit or hose toward the starting end. When two hose sections are thus connected the operator places the clamp comprising the arcuate members 24, 25 and 26 about the coupling 12, 15 with the cotter pin 66 in place, the cable 22 having been placed in the groove 64 of sheave 61.

The force of the spring pressed pin 52 in urging the cable toward the groove 64 of sheave 61 is only sufficient to cause surface contact between the cable and the groove and not sufficient to interfere with movement of the cable lengthwise through this groove. The operator then may pull on the cable 22 in a direction toward the finishing end of the pipe to eliminate slack in the cable between this connection and the preceding one which has now been moved toward the starting end of the pipe.

With the cable thus tautened the operator removes the cotter pin 66 to release sheave 61 and thereafter any tendency for relative movement of cable 22 in either direction rotates the sheave 61 in such direction and thus causes the same to cam against and lock the cable against substantial longitudinal movement in such direction relative to the hose or conduit.

The several arcuate members 24, 25 and 26 have welded to their opposite edges angular arcuate shield members designated 70, 71 and 72, respectively. The shield members 70, 71 and 72 prevent access of mortar or other foreign matter to the interior of the clamp assembly.

I claim:

1. A combination conduit and cable assembly comprising a conduit having a plurality of spaced coupling members disposed therealong, a cable extending generally alongside said conduit, means associated with each of said plurality of couplings for attaching the cable thereto, each cable engaging means including cable locking means adapted to grip said cable upon attempted relative movement between the cable and conduit in either direction, and means for selectively rendering said cable locking means inoperative to permit free longitudinal movement of said cable relative to said conduit.

2. A combination conduit and cable assembly comprising a conduit having a plurality of spaced coupling members disposed therealong, a cable extending generally alongside said conduit, clamp means engageable about each of said coupling members for retaining the same against separation, means associated with each of said clamp means for attaching the cable thereto, each cable engaging means including cable locking means adapted to grip said cable upon attempted relative movement between the cable and conduit in either direction, and means for selectively rendering said cable locking means inoperative to permit free longitudinal movement of said cable relative to said conduit.

3. A combination conduit and cable assembly comprising a conduit having a plurality of spaced coupling members disposed therealong, a cable extending generally alongside said conduit, means associated with each of said plurality of couplings for attaching the cable thereto, each cable engaging means including a rotary cam and an abutment adjacent to but spaced from the periphery of said cam to define a cable passage therebetween, said cam having a low point to permit free longitudinal movement of said cable between said cam and said abutment, means for releasably securing said cam in said low point position, said cam being operative upon release of said securing means to rotate by longitudinal movement of said cable in either direction to wedge said cable between said cam and said abutment to prevent relative longitudinal movement between said cable and said conduit.

4. A combination conduit and cable assembly comprising a conduit having a plurality of spaced coupling members disposed therealong, a cable extending generally alongside said conduit, clamp means engageable about said coupling members for retaining the same against separation, means associated with each of said clamp means for attaching the cable thereto, each cable engaging means including a rotary cam and an abutment adjacent to but spaced from the periphery of said cam to define a cable passage therebetween, said cam having a low point to permit free longitudinal movement of said cable between said cam and said abutment, means for releasably securing said cam in said low point position, said cam being operative upon release of said securing means to rotate by longitudinal movement of said cable in either direction to wedge said cable between said cam and said abutment to prevent relative longitudinal movement between said cable and said conduit.

5. A combination conduit and cable assembly comprising a conduit having a plurality of spaced coupling members disposed therealong, a cable extending generally alongside said conduit, means associated with each of said plurality of couplings for attaching the cable thereto, each cable engaging means including a rotary cam and an abutment adjacent to but spaced from the periphery of said cam to define a cable passage therebetween, said cam having a low point to permit longitudinal movement of said cable between said cam and said abutment, means for releasably securing said cam in said low point position, means yieldably urging said cable toward said cam, said cam being operative upon release of said securing means to rotate by yieldable engagement of the cable thereagainst upon longitudinal movement of said cable in either direction to wedge said cable between said cam and said abutment to prevent relative longitudinal movement between said cable and said conduit.

6. A combination conduit and cable assembly comprising a conduit having a plurality of spaced coupling members disposed therealong, a cable extending generally alongside said conduit, clamp means engageable about said coupling members for retaining the same against separation, means associated with each of said clamp means for attaching the cable thereto, each cable engaging means including a rotary cam and an abutment adjacent to but spaced from the periphery of said cam to define a cable passage therebetween, said cam having a low point to permit longitudinal movement of said cable between said cam and said abutment, means for releasably securing said cam in said low point position, means yieldably urging said cable toward said cam, said cam being operative upon release of said securing means to rotate by yieldable engagement of the cable thereagainst upon longitudinal movement of said cable in either direction to wedge said cable between said cam and said abutment to prevent relative longitudinal movement between said cable and said conduit.

References Cited by the Examiner

UNITED STATES PATENTS

| | | | |
|---|---|---|---|
| 157,435 | 12/1874 | Wray. | |
| 894,300 | 7/1908 | Welles | 285—312 |
| 1,047,063 | 12/1912 | Irving et al. | 285—312 |
| 1,992,485 | 2/1935 | Holmes | 285—312 |
| 2,575,356 | 11/1951 | Mullinix | 24—263 |
| 3,046,938 | 7/1962 | Perkins | 24—134 X |

MORRIS KAPLAN, *Primary Examiner.*